Aug. 16, 1949.  A. C. HAGG  2,479,349
BEARING
Filed Sept. 14, 1944
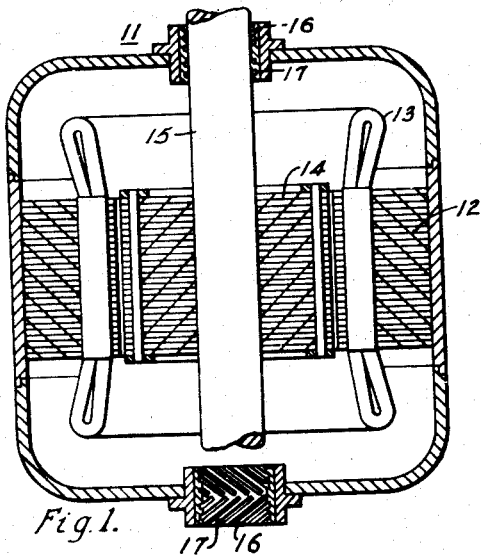
Fig.1.
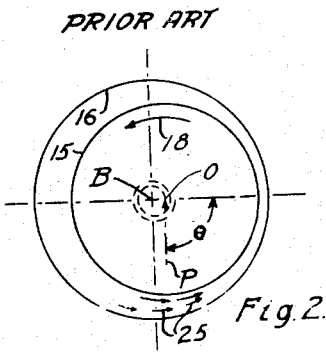
Fig.2.
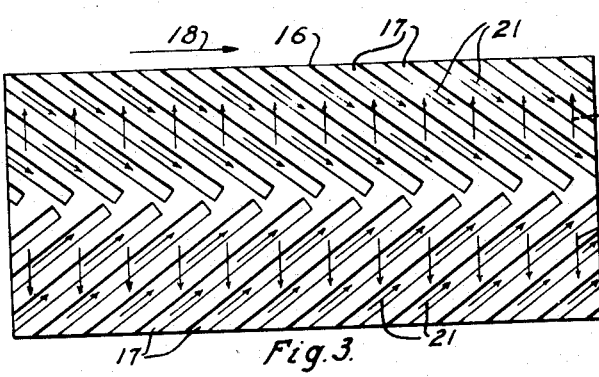
Fig.3.
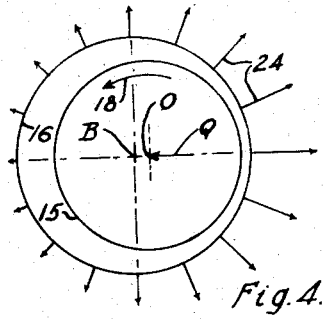
Fig.4.
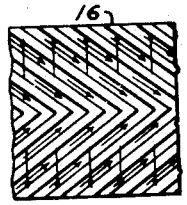 
Fig.5.  Fig.6.
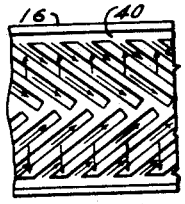 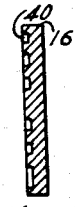
Fig.7.  Fig.8.
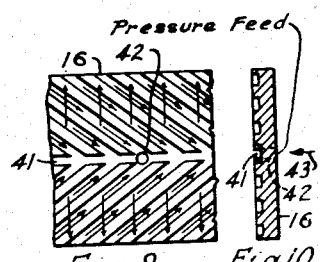
Fig.9.  Fig.10.
WITNESSES:
N. F. Susser
Wm. C. Groome
INVENTOR
Arthur C. Hagg.
BY O.D. Buchanan
ATTORNEY Patented Aug. 16, 1949

2,479,349

UNITED STATES PATENT OFFICE 2,479,349

BEARING

Arthur C. Hagg, Wilkinsburg, Pa., assignor to Westinghouse Electric Corporation, East Pittsburgh, Pa., a corporation of Pennsylvania Application September 14, 1944, Serial No. 553,999

10 Claims. (Cl. 308—240)

My invention relates to a stable, or non-whirling, journal-bearing, which is particularly adapted for journalling a rotor-member under such operating-conditions that there is only a light predominant bearing-load, imposed upon the bearing in any fixed radial direction, as, for example, in horizontal-shaft machines having light-weight rotors, or in vertical-shaft machines having vertical guide-bearings. It is particularly adapted for high-speed bearings.

As will subsequently be shown, a self-induced vibration-phenomenon of the journal, which has become known as "whirl," occurs in lightly loaded, plain, cylindrical sleeve-bearings, by reason of the fact that the resultant of the film-pressures of the fluid lubricating-film is applied at a displacement of a certain angle, usually approximating 90°, with respect to the journal-displacement within the cylindrical sleeve-member within which it is rotating. Heretofore, the only practical way of preventing such whirl, in lightly loaded guide or journal-bearings, has been to replace the cylindrical sleeve-member with a plurality of tilting pads or shoes.

The principal object of my present invention is to provide a full journal bearing, or one in which the cylindrical bearing-surfaces extend substantially completely around the entire inner circumference of the bore of the sleeve-member, and substantially completely around the entire outer circumference of the journal-member, with lubricant-feeding grooves so disposed that the fluid pressures which are built up around the circumference of the journal are predominantly determined by the dragging of the lubricating-fluid through said grooves, as a result of the rotation of the journal in the sleeve, as distinguished from the conventional journal-bearing, in which the circumferential distribution of the fluid-pressures is determined by the circumferential dragging of the fluid into a wedge-shaped film of lubricant. In my construction, the resultant of the film-pressures on the journal is approximately in opposition to any journal-displacement within the sleeve-member, rather than being at substantially right angles thereto, as in the conventional sleeve-type journal-bearing.

A more specific object of my invention is to provide one of the bearing-surfaces with one or more sets of herringbone grooves, a set of herringbone grooves comprising two rows of substantially parallel straight or curved grooves, which slope in reverse directions in the two rows. My invention is particularly adapted for machines having a rotating part which normally rotates in a single predetermined direction of rotation, and the herringbone grooves are so directed or oriented that the relative rotation of the journal within the sleeve drags the lubricating medium through the grooves in a direction toward the center line of the herringbone, so as to create the maximum film-pressure along said center line. If but a single herringbone groove-construction is utilized, said center line will be the axial center of the bearing.

With the foregoing and other objects in view, my invention consists in the structures, combinations, systems, assemblies, parts and methods hereinafter described and claimed, and illustrated in the accompanying drawing, wherein Figure 1 is a view of a vertical-shaft electric motor, journalled in accordance with my present invention, with parts broken away to illustrate the construction, Fig. 2 is a diagrammatic view of a plain cylindrical journal, rotating in a plain cylindrical sleeve, with the clearance between the journal and the sleeve very much exaggerated, for the purpose of illustration, and showing the whirl-producing force which my invention aims to overcome, Fig. 3 is a developed view of my grooved bearing-surface, usually the bearing-surface of the sleeve-member (although it could be the bearing-surface of the journal-member, with an opposite direction of rotation of the journal-member), Fig. 4 is a view similar to Fig. 2, but showing the circumferential film-pressure distribution which is produced as a result of my herringbone grooves, showing the resultant film-pressure in line with, and opposing, the displacement of the center of the journal with respect to the center of the sleeve, Fig. 5 is a fragmentary developed view, similar to Fig. 3, showing a modified form of grooving, Fig. 6 is a cross-sectional view of the grooved sleeve-member of Fig. 5, and Figs. 7 and 8 and Figs. 9 and 10 are pairs of views similar to Figs. 5 and 6, illustrating still further modifications of the grooving.

In Fig. 1, I have shown my invention, by way of example, as applied to a vertical-shaft electric motor 11, comprising a stator-member 12, carrying 3-phase primary-windings 13, and a squirrel-cage rotor-member 14 mounted on a vertical shaft 15 which is journalled in two sleeve-members 16 in accordance with my present invention. The outer surface of the shaft 15 constitutes a journal having a cylindrical bearing-surface, which may also be indicated by the numeral 15, which is of a slightly smaller diameter than the diameter of the inner periphery or bore 16 of the sleeve 16. In Figs. 2 and 4, the discrepancy in diameters is very much exaggerated, in order to be able to illustrate the phenomena. In ordinary practice, however, the difference between the two diameters is between 1 and 2 mils per inch of bearing-diameter.

In accordance with my invention, one or the other of the two bearing-surfaces 15 and 16 is provided with herringbone grooves 17. For convenience in discussion and illustration, it will be assumed, throughout this description, that the herringbone grooves 17 are provided in the bearing-surface 16 of the sleeve-member 16, using the same numeral for the bearing-surface and the element which provides said bearing-surface. It is to be understood, however, that the grooving could be placed on either one of the bearing-surfaces 15 or 16, that is, either on the journal or within the sleeve, the only difference being that the direction of inclination of the grooving would be reversed, for the journal with respect to the sleeve, or else the direction of rotation of the journal would be reversed, if the grooving were placed upon the journal rather than the sleeve.

A developed view of the grooved bearing-surface 16 is shown in Fig. 3. The herringbone grooves 17 are indicated as comprising two circumferential rows of grooves, extending axially and circumferentially inwardly from each end of the bearing-surface, in such direction or orientation that the relative motion of the journal-surface, as indicated by the arrow 18, drags the lubricant, by virtue of the viscosity of the lubricant, so that the lubricant is drawn from the ends of the bearing toward the center of the bearing, thus building up a lubricant-pressure, at the center of the bearing. The lubricant may be any fluid lubricant, having any degree of viscosity, so far as my present invention is concerned. The lubricant is assumed to be present in sufficient quantities to fill the entire space, including the grooves, between the journal 15 and the sleeve 16.

As shown in Fig. 3, therefore, the fluid lubricant flows inwardly, through the grooves 17, as indicated by the arrows 21, flowing toward the center line of the herringbone, where it builds up a considerable fluid-pressure. If the grooving is disposed in the form of a single herringbone, or a single pair of rows of oppositely inclined grooves, the center line of the herringbone is the center line of the bearing, both measured axially, but if a plurality of herringbones are provided, then each set or pair of rows of herringbone grooves may be regarded as a single bearing. From the center line of the herringbone, the lubricating fluid then flows axially along the bearing, toward the respective ends of the bearing, as indicated by the arrows 23.

The resistance to this axial flow 23 of the lubricating fluid will depend upon the spacing between the journal and the sleeve at any particular point around the circumference of the bearing. Since the lubricant-pressure is (or may be assumed to be) zero, at the ends of the bearing, the lubricant-pressure at the center of the bearing (assuming a single herringbone arrangement) will vary, at different points around the circumference of the bearing, in accordance with the fluid-pressure necessary to maintain the axial flow 23. The average pressure at any circumferential point varies approximately inversely as the square of the radial bearing-clearance at the point in question, as indicated by the arrows 24 in Fig. 4. As this fluid-pressure exerts itself in all directions, it presses inwardly upon the journal 15, with the same force with which it presses outwardly on the sleeve 16, producing a resultant pressure Q which is directed toward the center O of the journal 15, in line with the displacement BO between the sleeve-center B and the journal-center O, in such direction that the effective resultant force Q of the lubricating film acts in opposition to the journal-displacement BO.

The significance of this reaction will be better understood upon a consideration of the film-pressure reaction which obtains in a plain or un-grooved cylindrical sleeve bearing, as indicated in Fig. 2. In this case, the lubricant-pressure is developed by reason of the fact that the rotation of the journal 15 drags the lubricant into a wedge-shaped film, as indicated by the arrows 25 in Fig. 2. The resultant of the film-pressure is indicated at P in Fig. 2, pressing upwardly against or toward the journal-center O in a direction at substantially right angles to the displacement BO.

Ordinarily, in horizontal-shaft bearings, or even in vertical-shaft bearings, where the journal member is subject to a predominant bearing-load which is imposed upon the bearing in some fixed radial direction, as by reason of belting or gearing, the film-pressure P of Fig. 2 is opposed by the bearing-load, and usually no unstable motion of the journal is produced by said film-pressure P. However, in cases of light bearing-loads, there is no externally applied load for overcoming the resultant film-force P, so that the film-force P drives the journal-center O in a spiral path about the bearing-center B, as indicated by the dotted lines in Fig. 2. This spiral motion has been termed "whirl," and its frequency is usually about one-half, or less than one-half, of the rotational frequency of the journal about its own center O. This whirl is a self-induced vibration. The vibration is usually manifested in the rotor-member as indicated, although in some cases the film-force P causes a vibration which is mainly manifest in the stationary parts. In any event, the forces doing work in support of the vibration come from the lubricant-pressure P in the bearings.

While the dimensions and the precise spacing and direction or inclination of the grooves, for best results, are not particularly critical, fairly wide variations being quite tolerable, I prefer to observe certain limitations, for best results. The projected circumferential length of each groove 17 is preferably about three-eights of the bearing circumference, or approximately 135°, as indicated in Fig. 3, although this length can vary between about one-eighth and about one-half of the circumference of the bearing-surface.

The depth of the grooves 17 is preferably about the same, or of the same order of magnitude, as the average radial bearing-clearance between the journal and the sleeve-member, which is usually between about 1 mil and about 2 mils for each inch of bearing-radius. The groove-depth could be increased to about 3 to 5 times the radial clearance, without affecting the advantage with respect to the stability or non-whirling of the bearing, but the load-capacity of the bearing is decreased with deeper grooves, and hence it is not usually desirable to utilize such deep grooves.

The width of the grooves and the number of the grooves are not critical, but it is generally desirable that the area taken up by the grooving should be between about one-third and about one-half of the total bearing-area. It is usually desirable that the grooves should be approximately uniformly spaced. The inclination of the grooves, that is, the angle between the groove-direction and a tangent to the cylindrical bearing-surface at any point along the groove, may, or may not, be uniform. For bearings of unusual designs, these preferred dimensions may be departed from considerably, and in any event, the dimensions are not at all critical, that is, they do not need to be observed with any considerable degree of conformity.

The essential feature of the invention is that grooves shall be provided, extending both circumferentially and axially of the bearing, in such manner that the bearing-motion drags the lubricant inwardly, so as to build up a film-pressure, which causes the lubricant to flow back axially in the clearance-space between the journal and the sleeve.

In the form of embodiment of my invention shown in Fig. 3, the grooves 17 of the two rows of grooves, comprising a herringbone set, are separate from each other. That is, a groove of one row does not merge into a groove of the other row, but each groove terminates at or near the center line of the herringbone, and the grooves of the two rows are staggered with respect to each other, as viewed from the center line of the herringbone.

In Fig. 5, the corresponding grooves of the two rows of the herringbone are opposite to each other, and merge into each other at the center, in a sort of V-shaped configuration, producing the same result of dragging the lubricant through the grooves towards the points of the V's, or the center line of the herringbone.

In Fig. 7, a plain circumferential groove 40 is provided at each end of the herringbone, and if only one herringbone set of grooves is utilized for the entire bearing, each of the circumferential grooves 40 will also be close to the corresponding end of the bearing, so that the herringbone grooves extend diagonally inwardly, as before, starting substantially at the ends of the bearing. Or, in another manner of viewing the problem, the effective bearing-surface may be regarded as the area embraced between the two circumferential grooves 40 in Fig. 7, because it is this area in which is produced the lubricating film which sustains the bearing-load, and which keeps the journal out of metal-to-metal contact with the sleeve.

In Fig. 9, a still further modification of the grooving is indicated, in which a single circumferential central-groove 41 is provided, along the center line of the herringbone. This central groove 41 of Fig. 9, like the end-grooves 40 of Fig. 7, is approximately of the same width and depth as the herringbone grooves 17.

In Figs. 3 to 8, the fluid lubricant is assumed to be fed, or made available, at the respective ends of the bearing, so that the rotation of the journal with respect to the sleeve will drag the lubricant into the herringbone grooves, from each end of the bearing. In Figs. 9 and 10, however, a variation of the lubricant-feeding arrangement is indicated, through the provision of a lubricant-feed pipe and opening 42 extending radially through the sleeve 16, and connected to a source of supply of lubricant under pressure, as indicated by the arrow 43, and by the legend "pressure-feed" in Fig. 10.

Advantages of my new type of journal-bearing are:

(1) It is stable under almost all speed and load conditions, and with almost any lubricant.
(2) It has an excellent load-capacity comparing favorably with plain journal-bearings.
(3) It provides true hydrodynamic film-lubrication, with no metal-to-metal contact, under running conditions.
(4) It is simple and inexpensive to make, as compared to the shoe-type journal-bearing, or other forms of stable or non-whirling bearings.

I claim as my invention:

1. A journal bearing comprising a relatively stationary sleeve-member and a relatively rotating journal-member therein, with a cylindrical clearance-space therebetween, said bearing having a cylindrical fluid lubricating-film in the clearance-space between said members, the bearing-surface of one of said members having herringbone grooves therein so that the relative rotation of the journal drags the lubricating medium through the grooves in a direction toward the centerline of the herringbone, the bearing-structure being oil-tight at said centerline of the herringbone whereby the lubricating medium which is dragged to said centerline by the herringbone grooves escapes axially to the respective ends of the bearing through said clearance-space between said members.

2. A journal bearing comprising a relatively stationary sleeve-member and a relatively rotating journal-member therein, with a cylindrical clearance-space therebetween, said bearing having a cylindrical fluid lubricating-film in the clearance-space between said members, the bearing-surface of one of said members having a plurality of short, parallel, inclined grooves therein extending in directions inclined to both the circumferential and axial direction, each groove extending from one end of the bearing to an inner region of the bearing, so that the relative rotation of the journal drags the lubricating medium through the grooves in a direction toward said inner region of the bearing, the bearing-structure being oil-tight at said inner region, whereby the lubricating medium which is dragged to said inner region by the grooves escapes axially to said end of the bearing through said clearance-space between said members.

3. The invention as defined in claim 2, characterized by the projected circumferential length of each groove being between about one-eighth and about one-half of the circumference of the bearing-surface.

4. The invention as defined in claim 2, characterized by the depth of the grooves being of the same order of magnitude as the average radial bearing-clearance between the journal-member and the sleeve-member.

5. The invention as defined in claim 2, characterized by the area taken up by the grooving being between about one-third and about one-half of the total area of the bearing surface before grooving.

6. The invention as defined in claim 2, characterized by the depth of the grooves being of the same order of magnitude as the average radial bearing-clearance between the journal-member and the sleeve-member, and the area taken up by the grooving being between about one-third and about one-half of the total area of the bearing-surface before grooving.

7. The invention as defined in claim 2, characterized by the projected circumferential length of each groove being between about one-eighth and about one-half of the circumference of the bearing-surface, the depth of the grooves being of the same order of magnitude as the average radial bearing-clearance between the journal-member and the sleeve-member, and the area taken up by the grooving being between about one-third and about one-half of the total area of the bearing-surface before grooving.

8. The invention as defined in claim 2, characterized by the depth of the grooves being between about .001 inch and about .002 inch for each inch of journal-radius.

9. The invention as defined in claim 2, characterized by the depth of the grooves being between about .001 inch and about .002 inch for each inch of journal-radius, and the area taken up by the grooving being between about one-third and about one-half of the total area of the bearing-surface before grooving.

10. The invention as defined in claim 2, characterized by the projected circumferential length of each groove being between about one-eighth and about one-half of the circumference of the bearing-surface, the depth of the grooves being between about .001 inch and about .002 inch for each inch of journal-radius, and the area taken up by the grooving being between about one-third and about one-half of the total area of the bearing-surface before grooving.

ARTHUR C. HAGG.

REFERENCES CITED

The following references are of record in the file of this patent:

UNITED STATES PATENTS

| Number | Name | Date |
|---|---|---|
| 50,445 | Bruen | Oct. 17, 1865 |
| 974,966 | Holtorp | Nov. 8, 1910 |
| 2,249,843 | Marsland | July 22, 1941 |